UNITED STATES PATENT OFFICE.

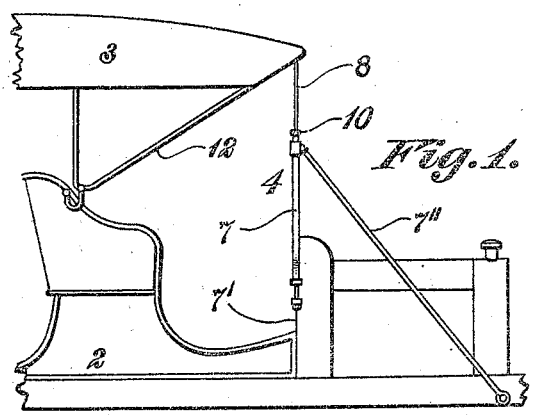
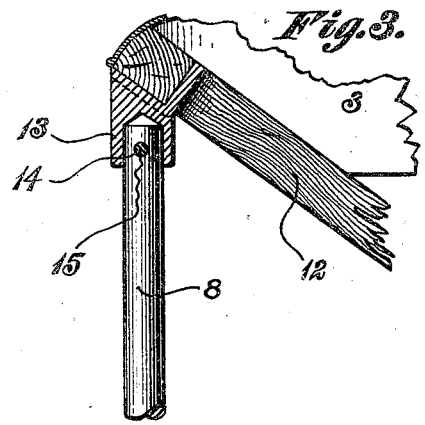
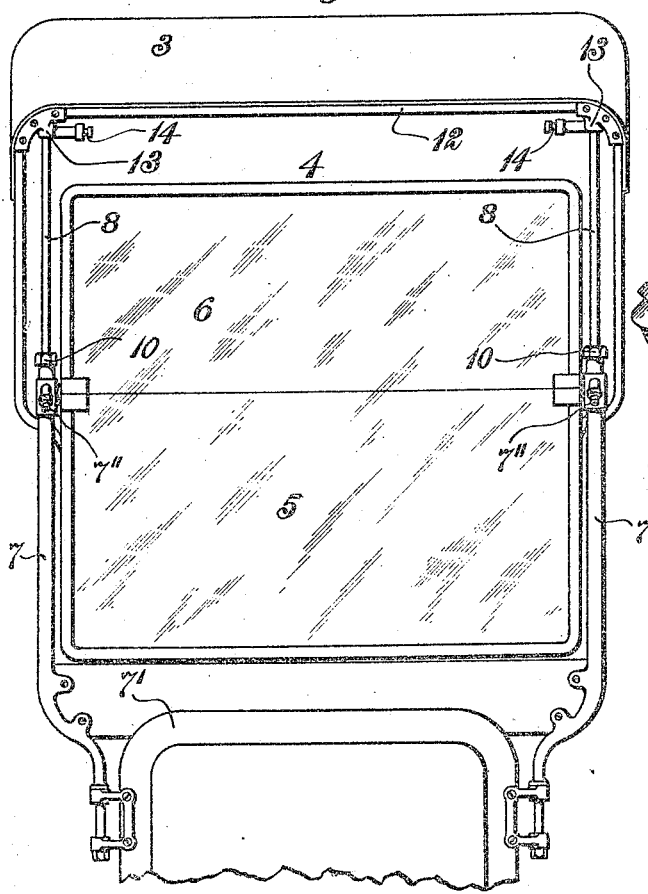
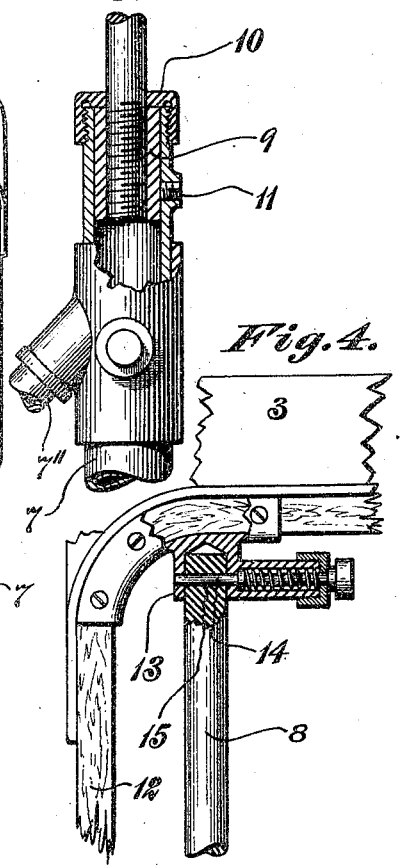

WILLIAM R. DONEGAN AND JOHN J. WALSH, OF HARTFORD, CONNECTICUT.

WIND-SHIELD ATTACHMENT.

1,046,565. Specification of Letters Patent. Patented Dec. 10, 1912.

Application filed January 9, 1911. Serial No. 601,520.

*To all whom it may concern:*

Be it known that we, WILLIAM R. DONEGAN and JOHN J. WALSH, citizens of the United States, residing at Hartford, in the county of Hartford and State of Connecticut, have invented certain new and useful Improvements in Wind-Shield Attachments, of which the following is a specification.

This invention relates to what we shall for convenience term a wind shield attachment, and the device is susceptible of advantageous use in various connections, but especially in conjunction with or as part of an automobile or motor car. It is the custom to provide such a vehicle with a top, and it is usual to connect with the front bow or other part of said top, a pair of straps, the latter being also connected with some part of the hood or other portion of the automobile structure. The function of these straps is to hold the top in position when up. It is a point of great desirability to maintain the front bow in a given position, but the straps fail in this respect. If the straps be too tight the bow is pulled too far forward, and the top is unduly stretched or misshapen. On the other hand, if the straps are too loose they naturally flap and the top is buckled or creased. In either event the effect is very undesirable, and it is a matter of fact that it requires an expert to properly adjust the straps and top and even he cannot always attain this result.

We provide a construction wherein the disadvantages alluded to are wholly eliminated, and we assure at all times and under all conditions the maintenance of the front bow or forward portion of the top in a definite position and rigidly and substantially secure it in this relation. To obtain this result we interpose supporting means between the top and the wind shield, and while said means may be of any suitable character, they consist preferably of rigid members and rods or their equivalents answer satisfactorily in this connection. The rods effectually brace the top and hold it securely in the proper position. We prefer that the parts be so organized whether we use rods or not that the wind shield can be opened or closed if of foldable type, and the top let down or put up at any time without interference with each other. In other words the presence of the supports to which reference has been made, affects in no wise the action of the top and wind shield.

In the drawings accompanying and forming part of the present specification, we show in detail one simple form of embodiment of the invention, which to enable those skilled in the art to practise the same will be set forth in detail in the following description, while the novelty of the invention will be included in the claims succeeding said description. From the observation just made, it will be clear that we do not restrict ourselves to the showing made by said drawings and description; we may depart therefrom in several respects within the scope of our invention.

Referring to said drawings: Figure 1 is a side elevation of an automobile equipped with an attachment involving our invention. Fig. 2 is a front elevation of the upper portion of such car. Fig. 3 is a detail view of one of the rods or supports and its several connections, and, Fig. 4 is a similar view of the upper portion of one of the rods and the fastening means therefor connected with the top.

The several figures, as will be clear are on different scales and throughout the same like characters refer to like parts.

In Fig. 1 of the drawings we have shown the body 2 of an automobile provided with a top 3 and to the dash of said car is represented connected a wind shield denoted in a general way by 4 and all of these parts may be and are of well-known kinds. The wind shield 4 comprises a lower or main section 5 and an upper or swinging section 6, it being usual to connect the lower section 5 in some rigid manner with the frame 7 of the wind shield. This frame 7 is generally connected rigidly with the dash 7' of the car, and it ordinarily has connected therewith braces 7'' also connected with the car body or other relatively stationary part.

From the statements already made it will be apparent that in connection with a wind shield such for instance as that already described, we provide supports for the top, said supports being preferably but not necessarily directly associated with the wind shield and being capable of detachable connection with the top. It is possible that this particular relation may be reversed, although the other construction is, as will be gathered, the preferable one. While the supports may vary decidedly in character, we have shown for such purpose two rods 8 which preferably, although not essentially have a telescopic connection with the wind shield 4, the side bars of the frame 7 for this purpose being made in the form of tubes by reason of which the said rods 8 can be raised and lowered for a purpose that will hereinafter appear. While the rods have this vertical movement, they are adapted when the top is up, to be solidly held in their operative or top supporting relations as will hereinafter appear, and for this purpose any suitable means may be provided. The lower ends of the rods are threaded to receive the nut-sleeves 9, said nut-sleeves 9 being slidable in the side bars in the frame 7 and therefore constituting an adjustable part of the respective rods. The hollow or tubular side bars of the frame are capped by nuts 10 constituting, as will hereinafter appear, suitable stops, although we might indicate at this point that when the nut-sleeves or adjustable collars 9 strike the nuts or stops 10, this will indicate definitely that the rods 8 have been elevated to the precise and exact extent which the particular conditions demand. We have shown tapped through the hollow side bars of the frame 7 set screws 11 adapted to engage the sleeves or collars 9 to thereby substantially hold the rods 8 in operative position. It will be clear that by slightly backing out the screws 11, the rods 8 will be released and can, therefore, be lowered into the tubular side bars of the frame 7 so as to be housed thereby, this procedure being followed when the top 3 is to be closed.

In the present case the upper ends of the rods are adapted for detachable connection with the top 3, and there are various ways by which this result can be obtained as there are different points of the top to which said rods can thus be united. As a matter of preference the rods are separably joined with the front bow 12. To the under side of said bow 12 and at the opposite sides of the top 3 we have shown rigidly connected the socket members 13 provided with spring bolts 14 movable through perforations 15 extending through the heads of the rods 8. In Fig. 4 the spring bolt 14 is shown connecting the coöperating rod 8 with the top 3. To release said particular rod, said coöperating bolt 14 will be drawn back and a similar operation being followed with respect to the opposite bolt, the two rods 8 will be lowered free of the socket members 13 at which point the top can be freely closed. It will also be evident that when the rods 8 are in operative or top supporting positions, the upper section 6 of the wind shield can be freely swung down and up without in any wise interfering with the top and its supports 8.

It is essential that the distance between the forward bow 12 and the top of the dash or the top of the wind shield 4 should not vary, and we provide, as will be understood from the observation already made, gage means for positively and under all circumstances insuring this result, such action in the present case being secured by the adjustable collar or nut 9. This collar or nut 9 in the first instance will be so adjusted on the rod 8 that when the said adjustable collar or nut strikes the stop or nut 10 this will indicate conclusively that the rods 8 have been elevated the exact distance.

What we claim is:

1. The combination of the wind shield and the foldable top of an automobile, and a plurality of independently longitudinally adjustable stay members extending between said top and said wind shield.

2. The combination of the foldable top and the wind shield of an automobile, a plurality of independently operable stay rods between the wind shield and the top, and independently adjustable devices carried by the respective rods, for determining the positions thereof.

3. The combination of the foldable top and wind shield of an automobile, the wind shield having tubular side bars, rods telescopic in said tubular side bars, adjustable members carried by the respective rods, and stops carried by the wind shield for engagement by said adjustable members, said rods being connected with said top.

4. The combination of the foldable top and the wind shield of an automobile, said wind shield having tubular side bars, rods telescopic in said side bars, sleeves adjustable on the rods, caps for said side bars, engageable by said sleeves, and sockets on the top to receive the upper ends of said rods.

5. The combination of the wind shield and the foldable top of an automobile, a plurality of independently movable stay rods slidingly connected with the wind shield, the top having a plurality of sockets to receive the respective rods, and means for positively and removably holding the rods in the sockets.

6. The combination of the foldable top and wind shield of an automobile, rods slidingly connected with the wind shield and adapted to be connected with the top, and means for independently varying the amount of elevation of said rods.

In testimony whereof we affix our signatures in presence of two witnesses.

WILLIAM R. DONEGAN.
JOHN J. WALSH.

Witnesses:
F. E. ANDERSON,
HEATH SUTHERLAND.